(12) United States Patent
Hergenhan (10) Patent No.: US 11,712,753 B2
(45) Date of Patent: Aug. 1, 2023

(54) METHOD FOR MAKING A THERMALLY STABLE CONNECTION BETWEEN A GLASS ELEMENT AND A SUPPORT ELEMENT, METHOD FOR PRODUCING AN OPTICAL DEVICE, AND OPTICAL DEVICE

(71) Applicant: JENOPTIK Optical Systems GmbH, Jena (DE)

(72) Inventor: Guido Hergenhan, Grossloebichau (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 17/917,805

(22) PCT Filed: Apr. 6, 2021

(86) PCT No.: PCT/EP2021/058894
§ 371 (c)(1),
(2) Date: Oct. 7, 2022

(87) PCT Pub. No.: WO2021/204776
PCT Pub. Date: Oct. 14, 2021

(65) Prior Publication Data
US 2023/0123641 A1    Apr. 20, 2023

(30) Foreign Application Priority Data
Apr. 9, 2020 (DE) ............ 10 2020 109 968.1

(51) Int. Cl.
*B23K 26/324* (2014.01)
*B23K 26/0622* (2014.01)
(Continued)

(52) U.S. Cl.
CPC .......... *B23K 26/324* (2013.01); *B23K 1/0008* (2013.01); *B23K 1/19* (2013.01);
(Continued)

(58) Field of Classification Search
CPC .. B23K 26/324; B23K 26/0624; B23K 26/22; B23K 1/0008; B23K 1/19; B23K 2103/18; B23K 2103/54
(Continued)

(56) References Cited

U.S. PATENT DOCUMENTS 11,529,701 B2 * 12/2022 Määttänen ............ B23K 26/24
2018/0033951 A1   2/2018 Shiragami

FOREIGN PATENT DOCUMENTS

JP    H 10-194795 A    7/1998
JP    2009-126005 A    6/2009
(Continued)

OTHER PUBLICATIONS

Yi et al., "The bonding between glass and metal," Intl J. of Adv. Mfg. Tech., vol. 111, No. 3-4, pp. 963-983, XP037266927 (Oct. 6, 2020).

*Primary Examiner* — Collin X Beatty
(74) *Attorney, Agent, or Firm* — Muncy, Geissler, Olds & Lowe, P.C.

(57) ABSTRACT

The invention relates to a method for thermally stable joining of a glass element to a support element, wherein the glass element has a first coefficient of expansion and the support element has a second coefficient of expansion differing from the first coefficient of expansion. The method thus comprises a step of attaching an intermediate glass material to the support element, wherein the intermediate glass material has a third coefficient of expansion which substantially corresponds to the second coefficient of expansion. In addition, the method comprises a step of local heating of the intermediate glass material in order to join the glass element to the support element via the intermediate glass material.

14 Claims, 4 Drawing Sheets

(51) Int. Cl.
*B23K 1/00* (2006.01)
*B23K 1/19* (2006.01)
*B23K 26/22* (2006.01)
*B23K 103/18* (2006.01)
*B23K 103/00* (2006.01)

(52) U.S. Cl.
CPC .......... *B23K 26/0624* (2015.10); *B23K 26/22* (2013.01); *B23K 2103/18* (2018.08); *B23K 2103/54* (2018.08)

(58) Field of Classification Search
USPC ........................................................ 359/811
See application file for complete search history.

(56) References Cited

FOREIGN PATENT DOCUMENTS

JP         2018-087122 A    6/2018
WO    WO-2013139448 A1 *   9/2013  ............. B23K 26/32

\* cited by examiner

METHOD FOR MAKING A THERMALLY STABLE CONNECTION BETWEEN A GLASS ELEMENT AND A SUPPORT ELEMENT, METHOD FOR PRODUCING AN OPTICAL DEVICE, AND OPTICAL DEVICE

This nonprovisional application is a National Stage of International Application No. PCT/EP2021/058894, which was filed on Apr. 6, 2021, and which claims priority to German Patent Application No. 10 2020 109 968.1, which was filed in Germany on Apr. 9, 2020, and which are both herein incorporated by reference.

BACKGROUND OF THE INVENTION

Field of the Invention

The present approach relates to a method for thermally stable joining of a glass element to a support element, a method for producing an optical device and an optical device.

Description of the Background Art

In DE 10 2016 213 561 A1 a method is described in which materials having similar coefficients of expansion are joined by means of adhesion, soldering or welding.

SUMMARY OF THE INVENTION

Against this background, a method for thermally stable joining of a glass element to a support element, a method for producing an optical device and an optical device according to the main claims is presented with the present approach. Advantageous designs can be seen from the respective sub-claims and the following description.

For tasks, for example in semiconductor exposure machines, smooth glass surfaces are required which are joined firmly to a ceramic support. At the same time, the components may be exposed to temperature variations during their processing, production and their transport. With the approach presented here, firm and adhesive-free joining of glass and the ceramic may be realized which even after process-related or transport-related heating may have a smooth surface at room temperature.

A method for thermally stable joining of a glass element to a support element is presented, wherein the glass element has a first coefficient of expansion and the support element has a second coefficient of expansion differing from the first coefficient of expansion. The method thus comprises a step of attaching an intermediate glass material to the support element, wherein the intermediate glass material has a third coefficient of expansion which substantially corresponds to the second coefficient of expansion. In addition, the method comprises a step of local heating of the intermediate glass material in order to join the glass element to the support element via the intermediate glass material.

For example, the glass element may be a titanium-doped quartz glass which may have, for example a TiO2 portion of less than about 20 wt. %. This is the case, for example in a so-called Ultra Low Expansion Glass (ULE glass). Such a glass element or one similar may have, for example a first coefficient of expansion of $0+/-3*10-8$ K-1, whereas the support element may have, for example a second coefficient of expansion of $3\times10^{-6}$ K$^{-1}$. The support element may be, for example a ceramic support or a metal support. Further materials of the support element may be, for example monocrystalline or polycrystalline solids, such as silicon, germanium, sapphire or quartz.

During direct joining of the glass element to the support element, for example by adhesion or soldering and accompanying temperature variations, the support element could expand depending on temperature, whereas the glass element could remain largely unchanged. Hence, there could be unevenness on the surface of the glass element. With the method presented here, such unevenness may be advantageously avoided in that the glass element may be joined to the support element without adhesive by means of an intermediate glass material. Unfortunately SiSiC ceramic in particular cannot be welded directly to the ULE glass due to graphite formation.

That is why an intermediate glass material, such as for example borosilicate glass, may be joined to the support element in a first step, for example by welding or soldering. Since the intermediate glass material, which may also be designated as glass 1, has a third coefficient of expansion which is similar to the second coefficient of expansion of the support element, for temperature changes, for example during welding, it may experience similar stress changes as the support element. In the case of common cooling to room temperature of, for example 20° C., the intermediate glass material may form a planar surface on the support element. For example, the intermediate glass material and the support element may have an identical coefficient of expansion or the coefficients of expansion of the intermediate glass material and of the support element may differ slightly, for example may have a deviation of less than 5%, less than 10%, less than 15% or less than 20%.

In a second step, the glass element, which may also be designated as glass 2, may be joined to the intermediate glass material by a selective thermal joining method, such as for example selective laser welding. Hence, the glass element and the intermediate glass material are heated simultaneously by means of laser and hence the glass element and the intermediate glass material are joined to one another. The intermediate glass material and the support element have been firmly joined previously by a global process for joining, such as for example welding or soldering. The glass element is thus joined to the intermediate glass material by local heating and is thus joined to the support element only indirectly via the intermediate glass material. During joining of the glass element to the intermediate glass material, the temperature of the support element according to one embodiment should remain at room temperature, since otherwise there may be distortion during cooling to room temperature. Accordingly, the use of laser welding is particularly advantageous, since using this method, a locally sufficient temperature increase is facilitated for the welding process with simultaneously almost constant temperature of the support element by means of ultra-short laser pulses.

As a result, a functional glass element may be joined to a metal body or ceramic body by means of an intermediate glass layer by the method presented, wherein the functional glass element and the metal body or ceramic body have different coefficients of expansion. Due to joining realized via a solder joint and a welding joint or via two welding joints, displacement of the components with respect to one another may also be minimized in the case of a temperature increase.

According to one example, in the step of attaching, the intermediate glass material may be fixed directly to the support element without using an intermediate layer. For example, the intermediate glass material, for example a borosilicate glass, may be welded onto the support element without additives, such as for example an adhesive. According to one embodiment, the entire component including the borosilicate glass may be heated to an appropriate joining temperature and then cooled. The intermediate glass material should thus be selected so that the coefficient of expansion of the intermediate glass material and of the support element are as equal as possible for the temperature difference between the welding temperature and the room temperature. Examples would be borosilicate glass and SiSiC ceramic, Invar and quartz glass or Kovar and so-called Jena instrument glass or glass or other material combinations having equivalent properties. The intermediate glass material and the support element may thus advantageously be joined cost-effectively and at the same time integrally. The use of adhesive between the support element and the glass element may thus be replaced by a joint which does not soften during moderate heating, for example up to 100° C.

According to a further example, in the step of attaching, the intermediate glass material may be shaped like a disc. For example, the intermediate glass material may be shaped as a glass disc which may be placed on a surface of the support element and then, for example welded or soldered to the support element. Advantageously, such a glass disc may be produced and stored cost-effectively.

According to a further example, the method may comprise a step of reducing a thickness of the intermediate glass material before the step of local heating. For example, the intermediate glass material may be thinned down after the step of attaching, for example by means of abrading to a thin layer of, for example about 100 µm so that a support element having a thin glass layer may be obtained. A thin layer may be understood to mean a layer of about 10-200 µm but which may always be dependent on the specific materials used and the properties thereof. Unevenness before reducing the thickness of the intermediate glass material may thus be, for example up to 1 mm in size. Advantageously, residual distortions of the surface in the range up to a few micrometres, for example up to 0.1 µm, of the glass applied may also be eliminated by a grinding and polishing process during reduction.

According to a further example, in the step of attaching, the intermediate glass material may be heated in order to join the intermediate glass material to the support element, wherein the step of attaching may be carried out before the step of local heating. For example, the intermediate glass material may be used as glass solder which may enter an integral joint with the support element in the course of a temperature increase. Advantageously, the step of attaching may thus be carried out favourably in terms of time and cost.

According to a further embodiment, the method may have an additional step of adding a solder to the support element, in order to attach the intermediate glass material to the support element by means of the solder. For example, a metal solder or a glass solder may be arranged between the support element and the intermediate glass material which has a lower melting point than the intermediate glass material. During heating of the solder, the latter may act in a joining manner between the support element and the intermediate glass material. Adaptation of the coefficients of expansion of support element and intermediate glass material may thus advantageously be facilitated, whereby the temperature required for the joining process may be reduced.

According to a further example, in the step of local heating, the glass element and the intermediate glass material may be heated using a pulsed laser beam. Joining of the glass element to the intermediate glass material may be effected, for example by laser welding by means of short pulse. This has the advantage that heating takes place only very locally and heating of the entire component, such as during welding or soldering or adhesive tempering, may be avoided.

According to a further example, in the step of local heating, the laser beam may be provided with short pulses in the range of nanoseconds or picoseconds or femtoseconds. For example, the pulses may lie, depending on the material of the glass element and of the intermediate glass material and parameters thereof, in the nanosecond range, but also in the picosecond and femtosecond range. Advantageously, the period of local heating may thus be kept very short hence avoiding the support element likewise being heated during the step of heating.

According to a further example, in the step of attaching, the intermediate glass material may be attached like a ring around a recess of the support element. For example, the support element may have a recess for passage of light. The recess may be covered by the light-permeable glass element. For example, the intermediate glass material may be provided and attached in the form of a ring-like disc. Attaching the intermediate glass material around the recess has the advantage that the glass element may be fixed uniformly around the recess.

The method may be supplemented according to the invention by a control unit having a computer program which is equipped to execute the previously shown steps of the method and additionally or alternatively to control them. This control unit may contain a machine-readable storage medium on which the computer program is stored.

In addition, a method for producing an optical device is presented, wherein the method comprises a step of provision of a support element and of a glass element, wherein the glass element has a first coefficient of expansion and the support element has a second coefficient of expansion differing from the first coefficient of expansion. In addition, the method comprises a step of joining the glass element to the support element while carrying out the steps of one variant of the previously presented method for thermally stable joining of a glass element to a support element. Advantageously, an optical device, which has a smooth surface at room temperature, even in the case of temperature variations, for example during transport, may be produced by means of such a production method. To carry out the method for producing an optical device, for example one or more control instruments for controlling the individual steps may be used. Hence, for example a control instrument may control adhesive-free joining of the individual components, for example by welding or soldering, while a further control instrument may realize, for example selective thermal joining between the assembled intermediate glass material and the glass element, for example by means of laser welding. In addition, a grinding and polishing device may be positioned so that residual distortions of the surface of the intermediate glass material in the range up to a few micrometres of the soldered-on glass may be processed.

According to one example, the support element may be shaped from ceramic and additionally or alternatively from metal. Advantageously, support elements can be produced particularly cost-effectively from ceramic or metal.

According to a further example, the first coefficient of expansion of the glass element may be less than $0.6 \times 10^{-6}$ $K^{-1}$ and additionally or alternatively the third coefficient of expansion of the intermediate glass material may lie in the range from $2 \times 10^{-6}$ $K^{-1}$ to $4 \times 10^{-6}$ $K^{-1}$. For example, the glass element may also experience an extremely low expansion even in the case of temperature variations, whereby it may advantageously be used in optical devices, for example in precision measuring technology, space travel and satellite technology, in laser resonators or in EUV sensor modules. At the same time, the intermediate glass material, which may be, for example borosilicate glass, may have, for example a coefficient of expansion of $3.3 \times 10^{-6}$ $K^{-1}$. The second coefficient of expansion of the support element may thus have a similar coefficient of expansion as the intermediate glass material, for example of $3.5 \times 10^{-6}$ $K^{-1}$. Advantageously, the support element and the intermediate glass material thus experience a similar expansion in the case of a temperature increase in the step of attaching, whereby stresses and unevenness on the assembled components may be minimized.

According to a further example, the support element may be shaped with a recess, wherein the recess may be covered by the glass element in the step of joining. For example, the intermediate glass material may thus be arranged like a ring around the recess so that the glass element may be fixed particularly uniformly on the support element. Advantageously, such a recess may be combined, for example with a light source, the light beam of which may be guided through the glass element.

In addition, an optical device having a support element and a glass element is presented, wherein the glass element has a first coefficient of expansion and the support element has a second coefficient of expansion differing from the first coefficient of expansion, wherein the support element is shaped with a recess which is covered or can be covered by the glass element, and wherein the support element and the glass element are joined by an intermediate glass material arranged on the recess, wherein the intermediate glass material has a third coefficient of expansion which substantially corresponds to the second coefficient of expansion. The glass element may thus be attached to a solid so that there are no distortions even after a temperature increase and subsequent cooling. Advantageously, such an optical device may be used in sensor modules, such as for example EUV sensor modules, that is a sensor module for sensing extreme ultraviolet radiation, or other high precision optical modules. Such a component unit is required there in order to guarantee the required properties without distortion.

In addition, a novel use of borosilicate glass as intermediate material is presented. For example, borosilicate glass may be used as intermediate glass material for joining a support element to a glass element. The borosilicate glass, similarly to a glass solder, may thus enter an integral joint both with the support element and with the glass element. Advantageously, additional joining layers, such as for example an adhesive, may be dispensed with when using borosilicate glass as intermediate glass material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of favourable examples of the present invention, the same or similar reference numbers are used for the elements shown in the different figures and with similar action, wherein repeated description of these elements is dispensed with.

Figure 1:
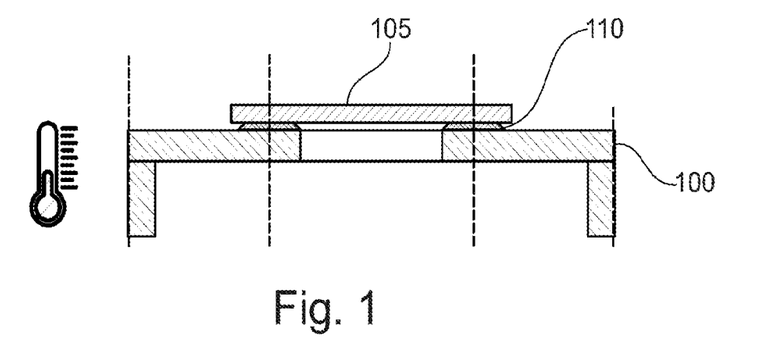
FIG. 1 shows a schematic representation of an example of a support element with adhered glass element at room temperature.

FIG. 1 shows a schematic representation of an example of a support element 100 with adhered glass element 105 at room temperature of only by way of example 20° C. Only by way of example is the support element 100 a ceramic support made of silicon-infiltrated silicon carbide (SiSiC) having a second coefficient of expansion of $3.0 \times 10^{-6}$ $K^{-1}$. A disc-like glass element 105 made of by way of example titanium-doped quartz glass which in this example has a first coefficient of expansion of approximately 0 $K^{-1}$, is adhered to the support element 100 only by way of example by means of an adhesive 110. The glass element 105 thus forms a smooth surface parallel to the support element 100 in the representation shown here.

Figure 2:
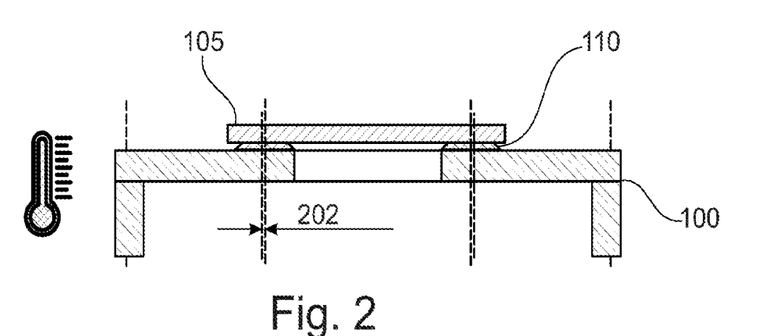
FIG. 2 shows a schematic representation of an example of a support element with adhered glass element at increased temperature.

FIG. 2 shows a schematic representation of an example of a support element 100 with adhered glass element 105 at increased temperature. The support element 100 shown here and the glass element 105 correspond or are similar to the support element and glass element described in preceding FIG. 1. In the representation shown here, both the support element 100 and the glass element are heated to only by way of example 80° C. in order to temper the adhesive 110, which may also be designated as a bond, arranged between them. The ceramic of the support element 100 thus expands, but the glass element 105 does not. A corresponding expansion 202 is indicated schematically in FIG. 2. The adhesive 110 softens and allows a relative displacement between the glass element 105 and the support element 100.

Figure 3:
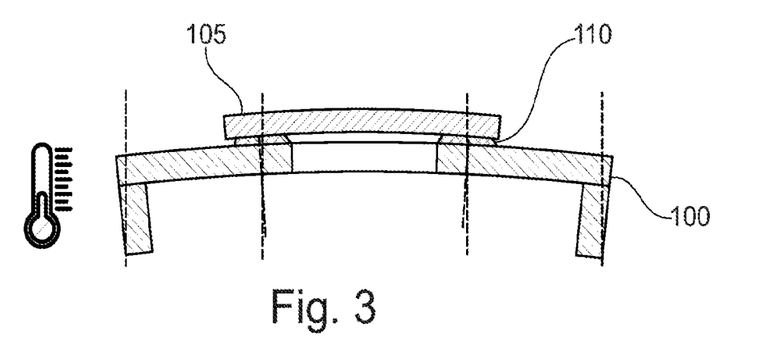
FIG. 3 shows a schematic representation of an example of a support element with adhered glass element after cooling.

FIG. 3 shows a schematic representation of an example of a support element 100 with adhered glass element 105 after cooling to room temperature. The support element 100 and the glass element 105 shown here correspond or are similar to the support element and glass element described in preceding FIGS. 1 and 2 with the difference that due to the heating described in preceding FIG. 2, the support element 100 and the glass element 105 shown here have a slight deformation. The adhesive 110 forms a firm joint below a glass transition temperature of the adhesive 110 which lies only by way of example between about 50° C. and 60° C. The ceramic support contracts again during cooling, however the glass element 105 does not. Accordingly, the glass element 105 shown here is distorted due to the bimetallic effect. In other words, the adhesive 110 breaks down thermally induced stresses in the case of joint partners having different coefficients of expansion above the glass temperature by displacing the joint partners and freezes them as it were after cooling in a displaced and hence in a wrong or incorrect position.

In another example, similar stresses or unevenness may also be caused by soldering. During soldering, the entire component is typically heated to the soldering temperature. During cooling to room temperature, the joint position is fixed at the solidification temperature of the solder so that in the case of a different coefficient of expansion of the soldered parts, a thermally induced stress is produced by cooling which leads to distortion of the surface. The effect is equivalent to adhesion, wherein the solidification temperature of the solder corresponds to the glass transition temperature of the adhesive. The melting point of a solder is sharply defined by the transition solid to liquid. The adhesive does not become liquid or in the sense of comparison to the solder, it does not actually become solid. The adhesive is amorphous and is thus a subcooled liquid which only changes its viscosity. The difference between soldering and adhesion at room temperature consists in that during soldering there is not even an initial state in which the joint partners are joined without stress and hence smoothly and firmly to one another.

Figure 4:
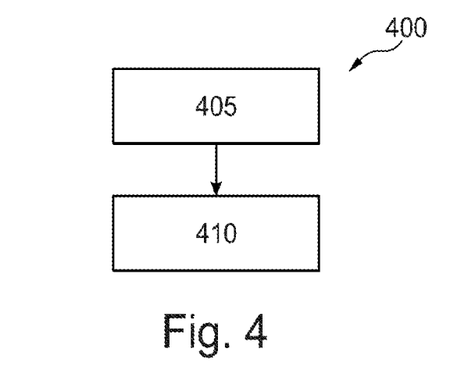
FIG. 4 shows a flow diagram of an example of a method for thermally stable joining of a glass element to a support element.

FIG. 4 shows a flow diagram of an example of a method 400 for thermally stable joining of a glass element to a support element, as have been described in preceding FIGS. 1 to 3, wherein the glass element has a first coefficient of expansion and the support element has a second coefficient of expansion differing from the first coefficient of expansion.

The method 400 comprises a step 405 of attaching an intermediate glass material to the support element, wherein the intermediate glass material has a third coefficient of expansion which substantially corresponds to the second coefficient of expansion. The intermediate glass material is applied, for example in one piece or in multiple pieces, for example in powder form. In this example, in the step 405 of attaching, only by way of example is the intermediate glass material attached like a ring around a recess of the support element and fixed directly to the support element without using an intermediate layer. Only by way of example is thus a borosilicate glass welded onto a ceramic support without using an intermediate layer or additives. In another example, the intermediate glass material is soldered onto the support element by means of a solder.

According to one example, the entire intermediate glass material and optionally also the support element is heated to a joining temperature which facilitates an integral joint between the intermediate glass material and the support element, for example in that the intermediate glass material is melted at least on one surface resting on the support element. Then the component is cooled in order to join the intermediate glass material permanently to the support element.

In one example, a step 410 of local heating of the intermediate glass material and of the glass element follows the step 405 of attaching in order to join the glass element to the intermediate glass material, whereby joining of the glass element to the support element is produced indirectly. The glass element is thus brought into contact mechanically with the welded-on borosilicate glass only by way of example and firm joining of the two glasses is realized by way of example by selective welding by means of an ultra-short pulse laser. The laser beam thus used is set only by way of example to short pulses for a duration of by way of example 10 nanoseconds in order to locally heat the intermediate glass material and the glass element. In another example, the short pulses are also provided in the range of picoseconds or femtoseconds. Using short pulses makes it possible for heating to be carried out only very locally and not, as in regular welding or soldering or adhesive tempering, heating of the entire component. Alternatively, however a non-pulsed laser beam may also be used to heat the intermediate glass material.

Figure 5:
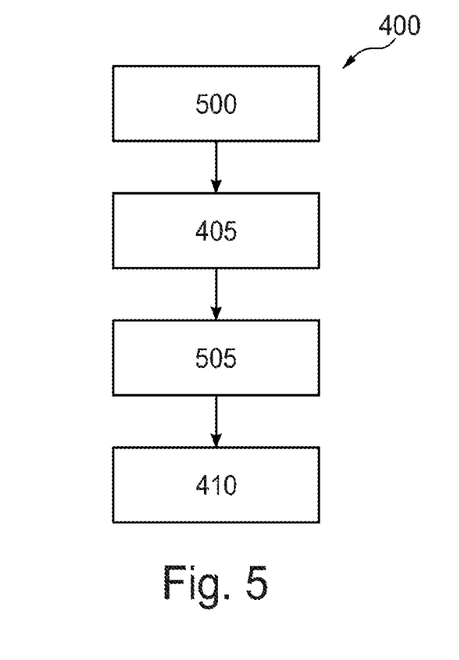
FIG. 5 shows a flow diagram of an example of a method for thermally stable joining of a glass element to a support element.

FIG. 5 shows a flow diagram of an example of a method 400 for thermally stable joining of a glass element to a support element. The method 400 shown here corresponds or is similar to the method described in preceding FIG. 4 with the difference that it has additional steps. Hence, in this example a step 500 of adding a solder to the support element precedes the step 405 of attaching. Only by way of example is a metal solder arranged on the support element in the step 500 of adding and the intermediate glass material shaped like a disc in this example placed on the metal solder. In the subsequent step 405 of attaching, the support element with the metal solder and the intermediate glass material is heated in order to attach the intermediate glass material to the support element by means of the solder. The intermediate glass material is thus selected so that the coefficient of expansion of the glass and of the ceramic of the support element are as equal as possible for the temperature difference between the solidification temperature of the solder and the room temperature. In this example, an additional step 505 of reducing a thickness of the intermediate glass material follows the step 405 of attaching. Only by way of example is the disc-like intermediate glass material thus ground and polished. Residual distortions of the surface of the soldered-on intermediate glass material are thus eliminated only by way of example in a range up to 20 μm by this grinding and polishing process. A moderate thermally induced mechanical stress between the intermediate glass material and the support element is thus cited. Only after the step 505 of reducing does the step 410 of local heating follow in this example, as has been described in preceding FIG. 4.

Figure 6:
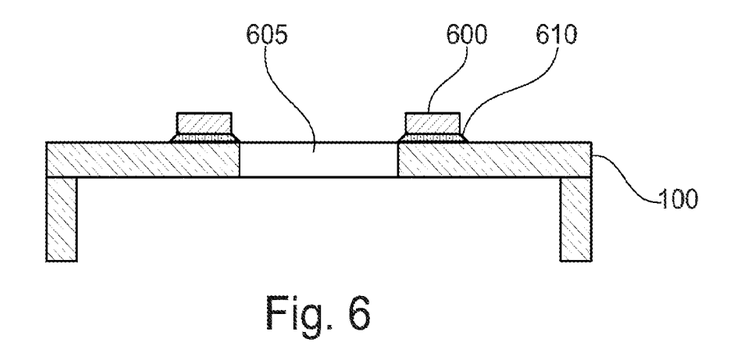
FIG. 6 shows a schematic cross-sectional representation of an example of a support element with attached intermediate glass material.

FIG. 6 shows a schematic cross-sectional representation of an example of a support element 100 with attached intermediate glass material 600. The support element 100 shown here corresponds or is similar to the support element described in the preceding figures. In this example, the support element 100, which is configured as a ceramic support only by way of example, has a recess 605 about which only by way of example borosilicate glass in ring-like design is arranged as intermediate glass material 600. The intermediate glass material 600 is only by way of example 150 μm thick and is joined to the support element 100 in this example by means of a glass solder 610. In another example, this joint may also be produced by means of a metallic solder or completely without an intermediate layer by a welding process.

Figure 7:
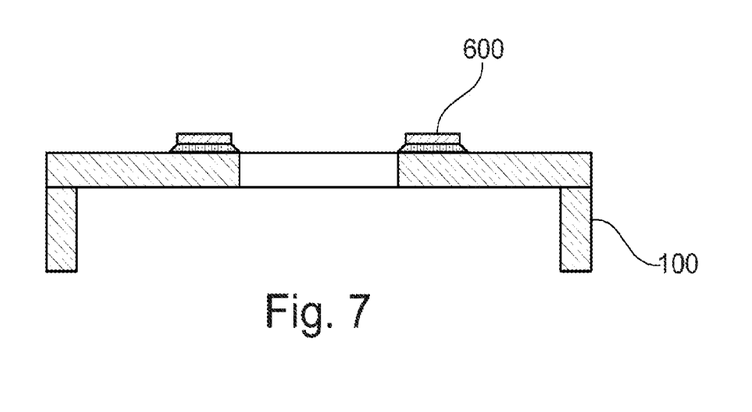
FIG. 7 shows a schematic cross-sectional representation of an example of a support element having reduced intermediate glass material.

FIG. 7 shows a schematic cross-sectional representation of an example of a support element 100 with reduced intermediate glass material 600. The support element 100 shown here corresponds or is similar to the support element described in the preceding figures and the intermediate glass material 600 shown here corresponds or is similar to the intermediate glass material described in preceding FIGS. 4 to 6. In this example, the intermediate glass material 600, for example starting from the state shown in FIG. 6, is reduced to a thickness of by way of example 100 µm so that it forms a particularly thin and planar glass layer on the support element 100. In another example, the layer of intermediate glass material may have a thickness of about 10 to 200 µm which however is always dependent on the specific materials and the properties thereof.

According to one example, reducing the thickness of the layer of the intermediate glass material 600 is carried out using a suitable reducing method, by means of which a planar surface of the intermediate glass material 600 is produced. A glass element can be placed on this planar surface facing away from the support element 100, as shown, for example in FIG. 8.

Figure 8:
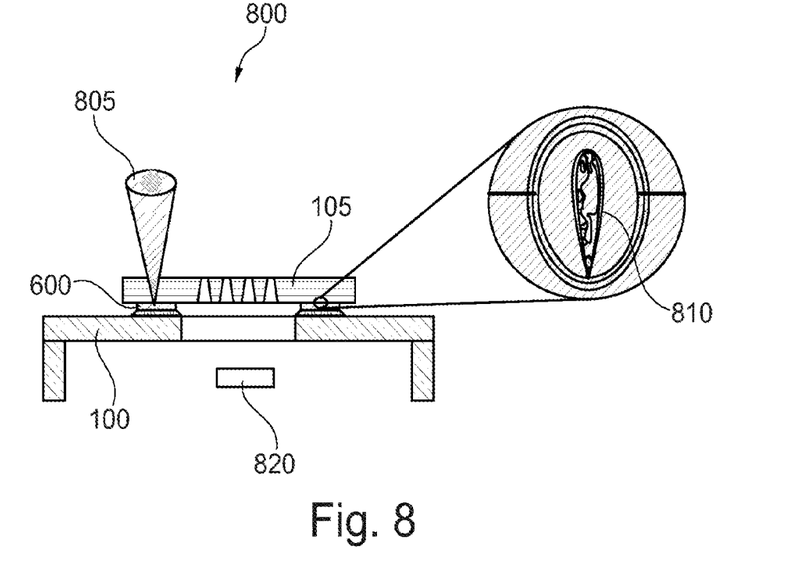
FIG. 8 shows a schematic cross-sectional representation of an example of an optical device.

FIG. 8 shows a schematic cross-sectional representation of an example of an optical device 800. The optical device 800 in this example comprises a support element 100, as has been described in the preceding figures, and a glass element 105, as has been described in preceding FIGS. 1 to 5. The glass element 105 is joined to the support element via an intermediate glass material 600, as has been described in preceding FIGS. 4 to 7. In order to solidify this joint, in one example a laser beam 805 is used which locally heats the intermediate glass material 600 using short pulses. Only by way of example do the short pulses of the laser beam 805 have a duration of 20 picoseconds. In another example, the short pulses may lie in a nanosecond range or in a second range depending on the material used and the parameters thereof. In this example, a welding bubble 810 can be generated in the intermediate glass material 600, by means of which an integral joint of the glass element 105 to the intermediate glass material 600 can be produced, by means of the laser beam 805, which may also be designated as UKP laser.

According to one example, the laser beam 805 is guided over the entire or a sub-region of the surface of the intermediate glass material 600 in order to join the intermediate glass material 600 securely to the glass element 105. By way of example, a series of welding points are set, as can be seen in the welding bubble 810. The whole surface is not necessarily welded. It suffices to set a certain number of welding points which are distributed over the surface.

According to one example, the optical device 800 is an EUV sensor module. By way of example, the support element 100 thus forms a housing for a sensor 820 to record extreme ultraviolet radiation passing through the glass element 105

Figure 9:
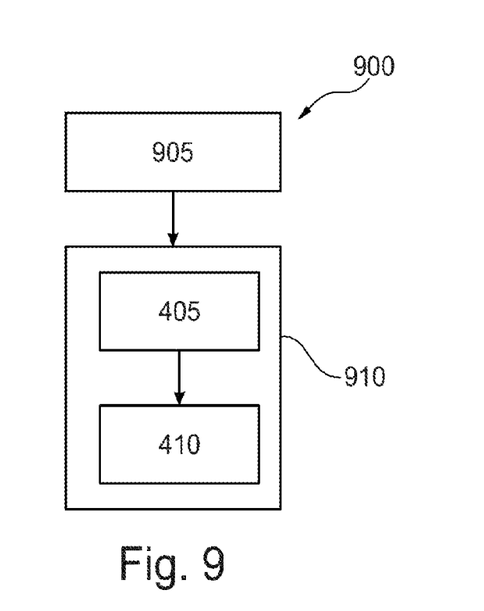
FIG. 9 shows a flow diagram of an example of a method for producing an optical device.

FIG. 9 shows a flow diagram of an example of a method 900 for producing an optical device, as has been described in preceding FIG. 8. The method 900 comprises a step 905 of providing a support element and a glass element, wherein the glass element has a first coefficient of expansion of only by way of example $0.4 \times 10^{-6}$ $K^{-1}$ and the support element has a second coefficient of expansion differing from the first coefficient of expansion. Only by way of example is the support element in this example shaped from ceramic and has a coefficient of expansion of by way of example $3 \times 10^{-6}$ $K^{-1}$. Alternatively, the support element may also be configured from metal or a combination of both materials. Then, in this example a step 910 of joining the glass element to the support element follows the step 905 of provision. The step 910 of joining comprises the sub-steps 405 and 410 of the method for thermally stable joining of a glass element to a support element, as has been described in preceding FIG. 4. Only by way of example is a recess shaped in the support element thus covered by the glass element.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Method for thermally stable joining of a glass element to a support element, wherein the glass element has a first coefficient of expansion and the support element has a second coefficient of expansion differing from the first coefficient of expansion and wherein the method comprises the following steps:
   attaching an intermediate glass material to the support element, wherein the intermediate glass material has a third coefficient of expansion which substantially corresponds to the second coefficient of expansion; and
   local heating of the intermediate glass material in order to join the glass element to the support element via the intermediate glass material.

2. Method according to claim 1, wherein in the step of attaching, the intermediate glass material is fixed directly to the support element without using an intermediate layer.

3. Method according to claim 1, wherein in the step of attaching, the intermediate glass material is shaped like a disc.

4. Method according to claim 1, having a step of reducing a thickness of the intermediate glass material before the step of local heating.

5. Method according to claim 1, wherein in the step of attaching, the intermediate glass material is heated in order to join the intermediate glass material to the support element, wherein the step of attaching is carried out before the step of local heating.

6. Method according to claim 1, having a step of adding a solder to the support element in order to attach the intermediate glass material to the support element by means of the solder.

7. Method according to claim 1, wherein in the step of local heating, the glass element and the intermediate glass material is heated using a pulsed laser beam.

8. Method according to claim 7, wherein in the step of local heating, the laser beam is provided with short pulses in the range of nanoseconds or picoseconds or femtoseconds.

9. Method according to claim 1, wherein in the step of attaching, the intermediate glass material is attached like a ring around a recess of the support element.

10. Method for producing an optical device, wherein the method comprises the following steps:
    provision of a support element and of a glass element, wherein the glass element has a first coefficient of expansion and the support element has a second coefficient of expansion differing from the first coefficient of expansion; and
    joining the glass element to the support element while carrying out the steps of the method for thermally stable joining of a glass element to a support element according to claim 1.

11. Method according to claim 10, wherein the support element is shaped from ceramic and/or metal.

12. Method according to claim 10, wherein the first coefficient of expansion of the glass element is less than $0.5 \times 10^{-6}$ K$^{-1}$ and/or the third coefficient of expansion of the intermediate glass material lies in the range from $2 \times 10^{-6}$ K$^{-1}$ to $4 \times 10^{-6}$ K$^{-1}$.

13. Method according to claim 10, wherein the support element is shaped with a recess, wherein the recess is covered by the glass element in the step of joining.

14. Optical device having a support element and a glass element, wherein the glass element has a first coefficient of expansion and the support element has a second coefficient of expansion differing from the first coefficient of expansion, wherein the support element is shaped with a recess which is covered or can be covered by the glass element, and wherein the support element and the glass element are joined by an intermediate glass material arranged on the recess, wherein the intermediate glass material has a third coefficient of expansion which substantially corresponds to the second coefficient of expansion.

* * * * *